Patented May 17, 1949

2,470,629

UNITED STATES PATENT OFFICE 2,470,629

PROCESS OF EMULSION POLYMERIZING BUTADIENES

Gerry P. Mack, Jackson Heights, N. Y., assignor to Advance Solvents & Chemical Corporation, New York, N. Y., a corporation of New York No Drawing. Application October 30, 1944, Serial No. 561,158

2 Claims. (Cl. 260—23.7)

My present invention relates to an improved process of emulsion polymerizing butadienes-1,3 alone or in mixture with other copolymerizable vinyl derivatives such as styrene, myrcene, acrylonitrile, acrylic acid esters and other vinyl and vinylidene derivatives which form polymerizable mixtures with butadienes-1,3. The term butadienes-1,3, as used in the present specification, is intended to include the unsubstituted butadiene-1,3 as well as its homologues and halogen derivatives such as isoprene dimethyl butadiene, pentadiene, methylpentadiene, 2-chloro-butadiene-1,3, 2-bromobutadiene-1,3 and the like and also mixtures of these compounds in the monomeric phase.

One object of my invention is to improve the stability of the monomeric butadiene and butadiene mixture emulsions which are prepared from the starting material by the addition of water and of suitable emulsifying agents for the purpose of subsequent polymerization.

Another object of the invention is to produce from these monomeric emulsions by polymerization thereof so-called polymer latices of high homogeneity and great stability which can be processed substantially like high-grade natural rubber latices.

A further object of the invention is to produce butadiene polymer latices which have a lower viscosity than comparable polymer latices produced by prior art methods.

A still further object of the invention is to increase the yield of rubber like polymer obtained from the emulsion polymerization of butadienes-1,3 or of mixtures of butadienes-1,3 with copolymerizable vinyl compounds.

Still another object of the invention is to improve the properties of the rubber like polymers obtainable from the emulsion polymerization of butadiene-1,3 or of their mixtures with copolymerizable vinyl derivatives, and particularly to produce polymers of increased plasticity which can be readily worked on rubber mills and will take up fillers and the like.

These and other objects, which will appear more clearly as the description proceeds, are accomplished, according to my invention, by a process in which the monomeric material to be polymerized is first emulsified with water in the presence of an emulsifying agent and of an emulsion stabilizer consisting of a sulfonated condensation product of at least one aromatic hydrocarbon containing from 2 to 3 rings with a lower aldehyde, and the emulsion thus formed is then heat polymerized.

It has been found that best results are obtained if the emulsion stabilizer is used in a proportion of between 0.25% and 3% by weight of the monomeric material to be polymerized.

Soaps, such as the alkali metal or ammonium salts of the higher fatty acids, e. g. of oleic, palmitic, myristic, stearic or abietic acid or synthetic detergents, such as higher alcohol sulfates, alkylated naphthalene sulfonic acids, sulfo succinate, ethylene oxide fatty acid condensates, alkali metal salts of rosin acids and others may be used as emulsifying agents in my process. I prefer to use the emulsifying agents in a proportion of between 4% and 8% calculated on the weight of the monomeric material, and I have found that, as far as plasticity of the rubbery polymer is concerned, best results are obtained if the higher fatty acid soaps are used as emulsifiers.

The polymerization of the emulsified monomeric material may be effected with or without a polymerization catalyst. Suitable catalysts are substances setting free oxygen, such as hydrogen peroxide, the persulfates, perborates, benzoyl peroxide, peracetic acid and the like.

Furthermore, the polymerization of the monomeric emulsions obtained according to my invention, may be effected in the presence of a polymerization regulator or modifier in the form of a paraffinic hydrocarbon containing at least six carbon atoms and having divalent sulfur attached thereto, such as for instance dodecyl mercaptans.

In the case of certain monomeric mixtures, it has been found that optimum yields are obtained by an emulsification of the monomeric mixture in the presence of an emulsion stabilizer consisting of a sulfonated condensate of an aromatic hydrocarbon containing 2 or 3 rings followed by a polymerization in the presence of a polymerization regulator such as described and claimed in my copending U. S. application Serial No. 524,103, now U. S. Patent 2,398,105 filed Feb. 26, 1944, i.e. of a paraffin complex sulfur regulator selected from the sulfur combined commercial paraffin waxes and oils which are substantially mixtures of 14 to 32 carbon atom paraffins and contain an average from about 18 to about 26 carbon atoms in the molecule with between about 9% and 17.5% by weight of sulfur attached at random to the carbon atoms of paraffins in the form of divalent sulfur groups.

Where polymerization regulators in the form of paraffin mercaptans or other paraffinic sulfide compounds are used, the polymerization may be effected with or without polymerization catalysts, but if such catalysts are to be employed, they ought to be of a type which is not poisoned by sulfide compounds.

Potassium persulfate and ammonium persulfate may be mentioned as polymerization catalysts for butadiene which are immune to sulfides.

The compounds which are used as emulsion stabilizers according to my invention may be graphically represented by the following general formula:

$$(A-R-A')SO_3X$$

where A and A' designate aromatic groups each containing from two to three carbon rings, R is a short aliphatic chain and X is a cation.

The aromatic groups designated by the symbols A and A' in the above formula may contain two or three condensed carbon rings, as in the case of naphthalene or anthracene groups, or they may contain from two to three uncondensed carbon rings, as is the case of diphenyl or terphenyl groups. The term "terphenyl" is intended to include the commercially available partially hydrogenated mixtures of ortho, meta and para terphenyl.

Compounds of this general type and processes for making such compounds are well known in the art and neither the compounds themselves nor their production form part of my invention. It may be mentioned, that the sulfonated condensates which are used in my process may be synthesized either by direct sulfonation of a hydrocarbon of the type A—R—A', or, as is usually more convenient and commercially practical, by causing at least one sulphonic acid of a suitable aromatic compound, such as for instance a naphthalene sulfonic acid, to react with a lower aldehyde.

The following group of examples may serve to illustrate the type of compounds which are useful as emulsion stabilizers in my process, but it should be understood that these examples are not intended to limit the scope of my invention as defined by the appended claims.

Example I

To 160 parts of concentrated sulfuric acid (specific gravity 1.84) contained in a sulphonator and maintained at 160° C. were added slowly with stirring 160 parts of refined naphthalene. After all of the naphthalene had been introduced, the mass was stirred at 160° C. for four hours longer until a test showed that substantially none of the naphthalene remained unsulfonated. The sulfonation mixture was then cooled to about 100° C. and diluted with 44 parts of water to prevent solidification on subsequent cooling. The diluted material was further cooled to 80° C. at which temperature 12 parts of a 40% aqueous solution of formaldehyde were added. The mixture was then stirred for three hours longer at 80° C. but at the end of each successive hour there were added 12 parts more of the formaldehyde solution, making a total at the end of the three hours of four portions or 48 parts in all. After all the formaldehyde had been added, the temperature was progressively raised over a period of one hour to 95–100° C. where it was maintained for 18 hours while the mass was constantly stirred. Soon after the temperature had been raised to 900–100° C. it was found that substantially none of the aldehyde remained unconsumed in the condensation reaction. During the later stages of the 18-hour heating period, the mixture progressively thickened until at the end it reached the consistency of thick molasses. In order to permit proper stirring, a small quantity of water was added to keep the material liquid. After the heating was completed, the mixture was cooled, neutralized with sodium hydroxide and dried. The product, hereafter called "emulsion stabilizer I", was a condensate of about 2 moles naphthalene beta-sodium sulfonate with about one mole formaldehyde.

Example II 460 parts by weight (about 3 moles) of diphenyl were sulfonated at about 80° C. with 200 parts by weight of concentrated sulfuric acid. The product was thoroughly mixed with 160 parts by weight of a 37½% aqueous solution of formaldehyde (about 2 moles) and the mixture heated under constant stirring until substantially all of the formaldehyde had been condensed with the diphenyl.

The product, hereafter called "emulsion stabilizer II," was identified as the sulfonated condensation product of about 3 moles of diphenyl with about 2 moles of formaldehyde.

Example III 145 parts by weight (about 8 moles) of anthracene were sulfonated at about 80° C. for four hours. The product was intimately mixed with 26 parts by weight of a 50% aqueous acetaldehyde solution (about 3 moles). The mixture was heated under stirring until the condensation had been completed.

The product, which was probably a condensate of 8 moles of anthraquinone beta-sulfonic acid with 3 moles acetaldehyde was designated as "emulsion stabilizer III."

Example IV 700 parts by weight (about 3 moles) of para terphenyl were sulphonated at about 100° C. for 6 hours with 600 parts by weight (about 6 moles) of concentrated sulfuric acid. 90 parts by weight of a 50% aqueous solution of acetaldehyde (about 1 mole) were stirred into the sulfonate and the mixture was maintained under constant agitation at a temperature of about 100° C. for 15 hours. At the end of this period it was found that practically all of the aldehyde had been condensed with the aromatic compound.

The product, hereafter called "emulsion stabilizer IV," was identified as a condensation product of about 3 moles of para terphenyl disulfonic acid with about one mole acetaldehyde.

Example V 700 parts by weight (about 3 moles) of a commercially available partially hydrogenated mixture of ortho, meta and para terphenyl was sulfonated for 6 hours at about 80° C. with about 300 parts by weight (about 3 moles) of concentrated sulfuric acid. The resulting sulfonate was condensed with 250 parts by weight (about 3 holes) of a 40% aqueous formaldehyde solution at 100° C. for 16 hours.

The product, hereafter called "emulsion stabilizer V," was identified as a condensate of a monosulfonic acid of a partly hydrogenated mixed terphenyl with formaldehyde in about equimolecular proportions.

Example VI 400 parts by weight (about 3 moles) of refined naphthalene and 700 parts by weight (about 3 moles) of a commercially available mixture of ortho, meta and para terphenyl were placed in a sulfonator with 600 parts by weight of concentrated sulfuric acid (specific gravity 1.84). The mixture was heated to 160° C. and maintained at this temperature under continuous stirring for four hours. The mixture was then cooled under simultaneous dilution with 300 parts by weight of water to about 80° C. and 400 parts by weight of a 37½% aqueous formaldehyde solution (about 5 moles) were gradually stirred into the mixture in the course of 5 hours. Thereafter, the temperature was raised to 110° C. and maintained at this height under continuous stirring for another 10 hours. Finally, the product was cooled and neutralized with sodium hydroxide.

The product, hereafter called "emulsion stabilizer VI," may be considered as a condensate of about 3 moles of naphthalene beta-sodium sulfonate and 3 moles of a sodium sulfonate of a mixed terphenyl with about 5 moles of formaldehyde.

The following examples illustrate various embodiments of the process according to my invention in which the monomeric starting materials have been emulsified in the presence of emulsion stabilizers as described in the preceding examples. It will be understood that the various ingredients and mixture proportions set forth in the following examples are given by way of illustration only and are not intended to limit the scope of my invention.

Example 2

|  | A | B | C | D |
| --- | --- | --- | --- | --- |
|  | Parts by weight | Parts by weight | Parts by weight | Parts by weight |
| Butadiene-1, 3 | 75.00 | 75.00 | 75.00 | 75.00 |
| Acrylo nitrile | 27.00 | 27.00 | 27.00 | 27.00 |
| Sodium Stearate | 2.40 | 2.40 | 2.40 | 2.40 |
| Sodium Oleate | 2.40 | 2.40 | 2.40 | 2.40 |
| Potassium Persulfate | 0.15 | 0.15 | 0.15 | 0.15 |
| Water | 300.00 | 300.00 | 300.00 | 300.00 |
| Dodecyl mercaptan | 0.00 | 0.00 | 0.48 | 0.00 |
| Paraffin Complex Sulfur Regulator | 0.00 | 0.48 | 0.00 | 0.48 |

In the form of a chlorinated and sulfur combined commercial paraffin scale wax having before chlorination and sulfuration a melting point between 52 and 54° C. and a molecular weight of approximately 300 and containing 1.6% by weight of chlorine and 9.3% by weight of divalent sulfur attached at random to the carbon atoms of the paraffins, about 68% of the total sulfur content being in the form of random attached hydrosulfide groups.

Example 2 (cont.)

|  | A | B | C | D |
| --- | --- | --- | --- | --- |
| Emulsion Stabilizer I (Emulsified by stirring together) | 0.00 | 0.00 | 0.60 | 0.60. |
| Monomer emulsion (Polymerized at 60° for 15 hours) | fair | fair | good | good. |
| Polymer Latex | poor | fair | good | good. |
| Yield | 45% | 62% | 57% | 88%. |
| Product | tough | tough rubbery. | soft rubbery workable. | soft rubbery workable |

Example 1

|  | A | B |
| --- | --- | --- |
| Butadiene-1,3 parts by weight | 75.00 | 75.00 |
| Styrene do | 24.00 | 24.00 |
| Sodium Stearate do | 2.40 | 2.40 |
| Sodium Oleate do | 2.40 | 2.40 |
| Dodecyl Mercaptan do | 0.32 | 0.32 |
| Potassium Persulfate do | 0.90 | 0.90 |
| Water do | 300.00 | 300.00 |
| Emulsion Stabilizer I do |  | 0.6 |
| Monomer Emulsion | fair | good |
| Polymer Latex | poor | good |
| Yield percent | 72 | 95 |
| Product | tough | soft-rubbery |

The ingredients were emulsified by adding the monomers and the mercaptan to a water solution of the soaps and emulsion stabilizer and using a high speed stirrer. The emulsion was then heated in an autoclave and polymerized for 20 hours at 60° C.

In the process according to the invention, as illustrated by column B of the example, a stable monomer emulsion was formed. During the polymerization reaction, the tendency of the rubbery polymer to precipitate, which was observed in the case of the reaction mixture set forth in column A, was absent in the case of the mixture according to column B. After polymerization, the polymer latex obtained from the mixture according to column B was stable and did not settle out or cream. Its viscosity was considerably lower than that of the corresponding latex obtained from the reaction mixture according to column A.

The yield of rubbery polymer obtained after coagulation of the latex, from the mixture according to column B was about 32% greater than that obtained from the mixture according to column A, and the character of the polymer resulting from the mixture according to column B was of the desired soft rubbery type similar to natural rubber, whereas the polymer obtained from the mixture according to column A was tough and did not mill well.

This example shows that for the particular monomeric mixture treated the addition of an emulsion stabilizer according to the invention yielded always an improved latex and an end-product having more desirable characteristics. However, maximum quantitative yield was obtained only where an emulsion made in the presence of an emulsion stabilizer according to the invention was subsequently polymerized in the presence of a paraffin complex sulfur polymerization regulator as set forth in Example 1 of my copending application Ser. No. 524,103 now U. S. Patent No. 2,398,105. (See column D.)

Example 3

An emulsion was produced by stirring together the following ingredients:

| | Parts by weight |
| --- | --- |
| 2,3-dimethyl-butadiene-1,3 | 100 |
| Sodium abietates | 3 |
| Potassium stearate | 5 |
| Sodium persulfate | 2 |
| Water | 80 |
| Emulsion stabilizer II | 0.25 |

A stable emulsion was obtained which was polymerized for 20 hours at 50° C. The resulting latex was smooth and homogeneous but showed a slight creaming tendency when heated. Upon coagulation there were obtained 85% of the theoretical yield of a rubbery polymer which could be worked on a rubber mill but was slightly tougher than the polymer obtained from the mixture according to column B of Example 1.

Example 4

The following ingredients were stirred together.

| | Parts by weight |
| --- | --- |
| Butadiene-1,3 | 60.00 |
| Isoprene | 40.00 |
| Sodium palmitate | 5.00 |
| Benzoyl peroxide | 1.00 |
| Water | 100.00 |
| Emulsion stabilizer III | 1.00 |

The resulting emulsion was smooth and showed high stability. It was polymerized for 20 hours at 52° C. and thereby converted into a latex which was completely homogeneous and very stable. Upon coagulation, the yield was 80% of a rubbery polymer which could be milled and worked on a conventional rubber kneading machine.

Example 5

A momomeric emulsion was prepared from the following ingredients:

| | Parts by weight |
|---|---|
| Butadiene-1,3 | 75.00 |
| 2-methyl-pentadiene | 25.00 |
| Sodium lauryl sulfate | 8.00 |
| Potassium persulfate | 0.80 |
| Water | 85.00 |
| Emulsion stabilizer IV | 1.30 |

A stable emulsion was obtained which was polymerized for 18 hours at 65° C. At the end of this period, the emulsion had been converted into a smooth polymer latex of high stability. On coagulation the yield was 80% of a soft rubbery polymer suitable for milling.

Example 6

The following ingredients were stirred together by means of a high speed mechanical stirrer:

| | Parts by weight |
|---|---|
| 2-chloro-butadiene-1,3 | 75.00 |
| Myrcene | 25.00 |
| Sodium palmitate | 5.00 |
| Sodium myristate | 2.00 |
| Sodium persulfate | 0.30 |
| Water | 90.00 |
| Emulsion stabilizer V | 2.00 |

Stirring was continued until an emulsion had been formed which was found to have excellent stability. The emulsion was heated to 58° C. and kept at this temperature under constant agitation for 8 hours. At the end of this period the emulsion had been completely converted into a homogeneous polymer latex which showed hardly any tendency to cream upon standing at room temperature. Coagulation yielded 93% of a soft rubbery polymer suitable for milling and working on ordinary crude rubber kneading machines.

Example 7

The following ingredients were stirred together:

| | Parts by weight |
|---|---|
| Butadiene-1,3 | 58.00 |
| Styrene | 19.00 |
| 2-methylpentadiene | 19.00 |
| Acrylonitrile | 4.00 |
| Alpha-sodium - sulfonate - beta - Isopropyl Naphthalene | 4.00 |
| Potassium persulfate | 0.25 |
| Paraffin complex sulfur regulator | 1.00 | in the form of a chlorinated and sulfur combined commercial paraffin scale wax having before chlorination and sulfuration a melting point between 52 and 54° C. and a molecular weight of approximately 300 and containing 1.6% by weight of chlorine and 9.3% by weight of divalent sulfur attached at random to the carbon atoms of the paraffins, about 68% of the total sulfur content being in the form of random attached hydrosulfide groups.

| | Parts by weight |
|---|---|
| Water | 200.00 |
| Emulsion stabilizer V | 2.30 |

Stirring was continued until a smooth emulsion had been formed which was found to have good stability. This emulsion was heated to 60° C. and kept at this temperature under agitation for 18 hours. At the end of this period, there was obtained a smooth uniform polymer latex which was completely free of any tendency to cream at ordinary temperatures. Coagulation yielded 95% of a very soft rubbery polymer similar to unvulcanized natural rubber.

Example 8

The following ingredients were mixed together and emulsified:

| | Parts by weight |
|---|---|
| Butadiene-1,3 | 55.00 |
| 2-methylpentadiene | 25.00 |
| Acrylonitrile | 20.00 |
| Sodium oleate | 6.00 |
| Paraffin complex sulfur regulator | 1.00 | in the form of a chlorinated and sulfur combined commercial paraffin scale wax having before chlorination and sulfuration a melting point between 52 and 54° C. and a molecular weight of about 300 and containing 2.5% by weight of chlorine and 16.4% by weight of divalent sulfur attached at random to the carbon atoms of the paraffin, about 67% of the total sulfur content being in the form of random attached hydrosulfide groups.

| | Parts by weight |
|---|---|
| Water | 200.00 |
| Emulsion stabilizer VI | 3.00 |

A uniform emulsion of excellent stability was obtained. Polymerization was carried out by heating this emulsion under stirring to 50° C. and keeping it at this temperature under constant agitation for 18 hours. A smooth, homogeneous and very stable polymer latex was obtained, from which a soft rubbery polymer suitable for milling on ordinary rubber working machines was recovered. The yield was 93% of theoretical.

I claim:

1. A process of emulsion polymerizing a mixture of about 55 parts by weight of butadiene-1,3, 25 parts by weight of methylpentadiene and 20 parts by weight of acrylonitrile, comprising the steps of emulsifying the mixture with about 200 parts by weight of water in the presence of about 6 parts by weight of a higher fatty acid soap emulsifier, about one part by weight of a paraffin complex sulfur polymerization regulator in the form of a chlorinated and sulfur combined commercial paraffin scale wax having before chlorination and sulfuration a melting point between 52 and 54° C. and a molecular weight of about 300 and containing 2.5% by weight of chlorine and 16.4% by weight of divalent sulfur attached at random to the carbon atoms of the paraffin, about 67% of the total sulfur content being in the form of random attached hydrosulfide groups, and about 3 parts by weight of a condensate of about 5 moles of formaldehyde with about 3 moles of naphthalene beta-sodium sulfonate and about 3 moles of a sodium sulfonate of a mixture of ortho, meta and para terphenyl, and polymerizing said emulsion for about 18 hours at about 50° C.

2. In a process of emulsion polymerizing, a monomeric material selected from the group consisting of the monomer of butadiene-1,3, isoprene, 2,3-dimethyl butadiene-1, 3,2-halo-butadiene-1,3, and mixtures of these monomers with other monomeric vinyl compounds capable of forming with said monomers solid copolymers in aqueous emulsion, the steps of emulsifying the monomeric material with water in the presence of an emulsifying agent and of an emulsion stabilizer which is the condensation product of about 3 moles of naphthalene beta-sodium sulfonate and about 3 moles of a sodium sulfonate of a mixture of ortho, meta and para terphenyl with about 5 moles of formaldehyde, and subjecting the emulsion thus formed to heat polymerization.

GERRY P. MACK.

REFERENCES CITED

The following references are of record in the file of this patent:

UNITED STATES PATENTS

| Number | Name | Date |
|---|---|---|
| 2,371,719 | Starkweather | Mar. 20, 1945 |
| 2,392,756 | Mighton | Jan. 8, 1946 |
| 2,398,105 | Mack | Apr. 9, 1946 |